United States Patent
Wang (10) Patent No.: US 10,163,338 B2
(45) Date of Patent: Dec. 25, 2018

(54) DETECTION AND TRANSMISSION SYSTEM CAPABLE OF TRANSMITTING SIGNALS ACCORDING TO OBJECT MOVEMENT

(71) Applicant: LEADOT INNOVATION, INC., Kaohsiung (TW)

(72) Inventor: Justin Wang, Taipei (TW)

(73) Assignee: LEADOT INNOVATION, INC., Kaohsiung (TW)

( * ) Notice: Subject to any disclaimer, the term of this patent is extended or adjusted under 35 U.S.C. 154(b) by 0 days.

(21) Appl. No.: 15/450,043

(22) Filed: Mar. 6, 2017

(65) Prior Publication Data

US 2017/0309168 A1  Oct. 26, 2017

(30) Foreign Application Priority Data

Apr. 26, 2016 (TW) .............................. 105112883 A (51) Int. Cl.
*G08C 23/02* (2006.01)
*H05B 37/02* (2006.01)
(52) U.S. Cl.
CPC ......... *G08C 23/02* (2013.01); *H05B 37/0218* (2013.01); *H05B 37/0227* (2013.01)
(58) Field of Classification Search
CPC .... G08C 23/02; G08C 17/02; G08C 2201/31; G08C 17/00; G08C 23/04; G08C 2201/20; G08C 2201/21; G08C 19/00

USPC .......................................................... 367/197
See application file for complete search history.

(56) References Cited

U.S. PATENT DOCUMENTS

| | | | |
|---|---|---|---|
| 2012/0038281 A1 | 2/2012 | Verfuerth | |
| 2014/0103814 A1 | 4/2014 | Both | |
| 2016/0313730 A1* | 10/2016 | Ricci | ..................... G05D 1/0027 |
| 2017/0067747 A1* | 3/2017 | Ricci | ................... G01C 21/3415 |
| 2017/0108935 A1* | 4/2017 | Ricci | ........................ G06F 3/017 |
| 2017/0213459 A1* | 7/2017 | Ogaz | ................. G08G 1/096725 |

FOREIGN PATENT DOCUMENTS

| | | |
|---|---|---|
| CN | 102098851 A | 6/2011 |
| CN | 102264169 B | 11/2015 |
| JP | S50-65067 | 6/1975 |
| JP | 200256991 | 2/2002 |
| JP | 2009-259584 A | 11/2009 |
| JP | 2014-35931 A | 2/2014 |
| TW | M300273 | 11/2006 |

\* cited by examiner

*Primary Examiner* — Mark Blouin
(74) *Attorney, Agent, or Firm* — Winston Hsu (57) ABSTRACT

A detection and transmission system includes a first detection and transmission device and a second detection and transmission device. The second detection and transmission device is disposed in a first direction from the first detection and transmission device. The first detection and transmission device generates a first sound signal toward the first direction when detecting a first moving object. The second detection and transmission device generates a second sound signal when receiving the first sound signal.

19 Claims, 5 Drawing Sheets

DETECTION AND TRANSMISSION SYSTEM CAPABLE OF TRANSMITTING SIGNALS ACCORDING TO OBJECT MOVEMENT

BACKGROUND OF THE INVENTION

1. Field of the Invention

This invention relates to a detection and transmission system, and more particularly, a detection and transmission system capable of transmitting signals according to object movement.

2. Description of the Prior Art

To save power consumption, monitoring devices are usually embedded in lighting devices in prior art. The monitoring device may be used to detect moving objects or living bodies, and the lighting devices will be turned on only when the moving objects or living bodies are detected. Consequently, the power consumption of the lighting devices caused during unnecessary time periods can be saved. In addition, since the lighting devices will be turned on when moving objects are detected, the unexpected lighting may deter the invader from further movement. That is, the lighting device with monitoring device can be used to guard against burglary.

However, if the object moves too fast, the lighting device may not be able to be turned on before the object passes. For example, since a vehicle can move rather fast, the driver may need wider range of visibility to control the vehicle. However, if the lighting device is not turned on soon enough before the vehicle approaches, the driver may not be able to control the direction or the speed of the vehicle in time when an obstacle appears suddenly. Therefore, how to turn on the lighting devices on the route of the moving object in time according to the direction of the object has become an issue to be solved.

SUMMARY OF THE INVENTION

One embodiment of the present invention discloses a detection and transmission system. The detection and transmission system includes a first detection and transmission device and a second detection and transmission device.

The first detection and transmission device includes a first object detector and a first sound generator. The first object detector detects object motion. The first sound generator generates sound signals. The second detection and transmission device is disposed along a first direction of the first detection and transmission device, and includes a second sound receiver and a second sound generator. The second sound receiver receives sound signals, and the second sound generator generates sound signals.

When the first object detector detects a first moving object, the first sound generator generates a first sound signal toward the first direction. When the second sound receiver receives the first sound signal, the second sound generator generates a second sound signal.

Another embodiment of the present invention discloses a method for operating a detection and transmission system. The detection and transmission system includes a first detection and transmission device and a second detection and transmission device. The second transmission device is disposed along a first direction of the first detection and transmission device. The method includes the first detection and transmission device generating a first sound signal toward the first direction when the first detection and transmission device detects a first moving object, and the second detection and transmission device generating a second sound signal when the second detection and transmission device receives the first sound signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
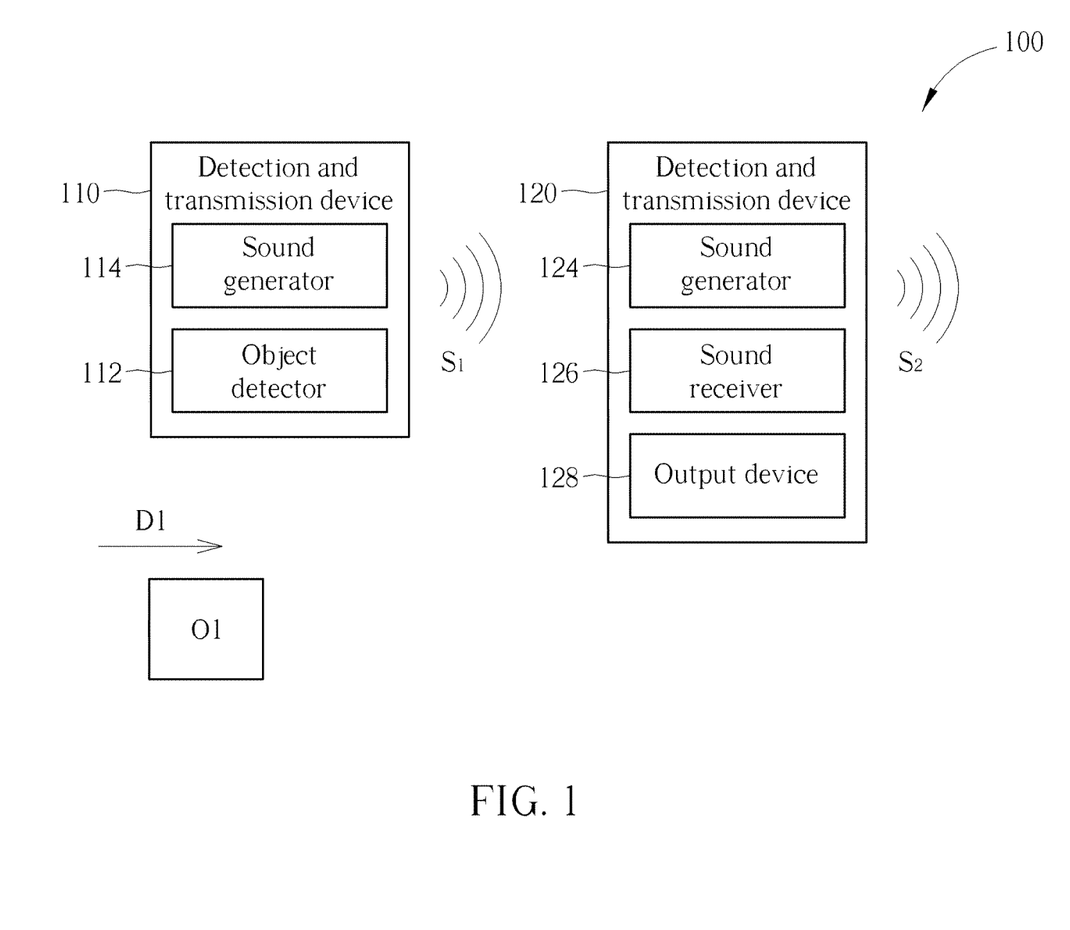
FIG. 1 shows a detection and transmission system according to one embodiment of the present invention.

FIG. 1 shows a detection and transmission system 100 according to one embodiment of the present invention. The detection and transmission system 100 includes detection and transmission devices 110 and 120. The detection and transmission device 110 includes an object detector 112 and a sound generator 114. The object detector 112 can detect moving objects, and the sound generator 114 can generate sound signals. The detection and transmission device 120 can be disposed along a first direction D1 of the detection and transmission device 110. The detection and transmission device 120 can include a sound generator 124 and a sound receiver 126. The sound generator 124 can generate sound signals, and the sound receiver 126 can receive the sound signals. In some embodiments of the present invention, the sound signals generated by the sound generators 114 and 124 can be ultrasound signals, thereby preventing the detection and transmission 110 and 120 devices from generating audible noise when transmitting sound signals.

In some embodiments, the object detector 112 may detect the surrounding thermal changes by the infrared ray detector. Therefore, when the thermal change caused by the moving object is detected, the object detector 112 may generate the detection signal accordingly. However, the object detector 112 is not limited to use the infrared ray detector. In some embodiments, the object detector 112 can also use the image capturing device to detect the image change in the surrounding environment, and generate the detection signals according to the movement of the object by observing the image changes.

In some embodiments, when the object detector 112 detects the moving object O1, the sound generator 114 may generate a sound signal $S_1$ along the first direction D1. That is, once the object detector 112 detects the moving object O1, the detection and transmission device 110 can transmit a corresponding signal to the detection and transmission device 120 disposed along the first direction D1. In some embodiments, the detection and transmission device 120 can further include an output device 128. The output device 128 can generate lights when the sound receiver 126 receives the sound signal $S_1$. Therefore, the detection and transmission system 100 can be used to guide the directions for the users.

In some embodiments, the object detector 112 can transmit signals to the detection and transmission device 120 according to the moving direction of the moving object O1. For example, when the object detector 112 detects the moving object O1, if the object detector 112 further identifies that the moving object O1 is moving along the first direction D1, the sound generator 114 will transmit the sound signal $S_1$ along the first direction D1. Since the detection and transmission device 120 is disposed on the first direction D1 with respect to the detection and transmission device 110, the sound receiver 126 can receive the sound signal $S_1$ generated by the sound generator 114. When the sound receiver 126 receives the sound signal $S_1$, the sound generator 124 can also generate a sound signal $S_2$ to notify the next detection and transmission device. Consequently, the detection and transmission system 100 can turn on the lights on the path along the moving direction of the moving object O1 by sending sound signals after detecting the moving direction of the moving object O1.

In some embodiments, when the sound receiver 126 receives the sound signal $S_1$, the output device 128 may also generate audio signals, video signals, audio and video signals, or network signals according to the requirement of the system. For example, when the detection and transmission system 100 is applied to tour guidance, the output device 128 may play the audio file and/or the video file corresponding to the exhibitions or the attractions of the tour. Or, when the detection and transmission system 100 is applied to guard against burglary, the output device 128 may generate a warning alarm to deter the invaders, or generate the network signals to notify the security system. Or, when the detection and transmission system 100 is applied to the parking lots or the roads for providing lighting, the detection and transmission system 100 may activate the lighting device only when approaching object is detected for saving power consumption since these locations may not be occupied by people all the time.

Figure 2:
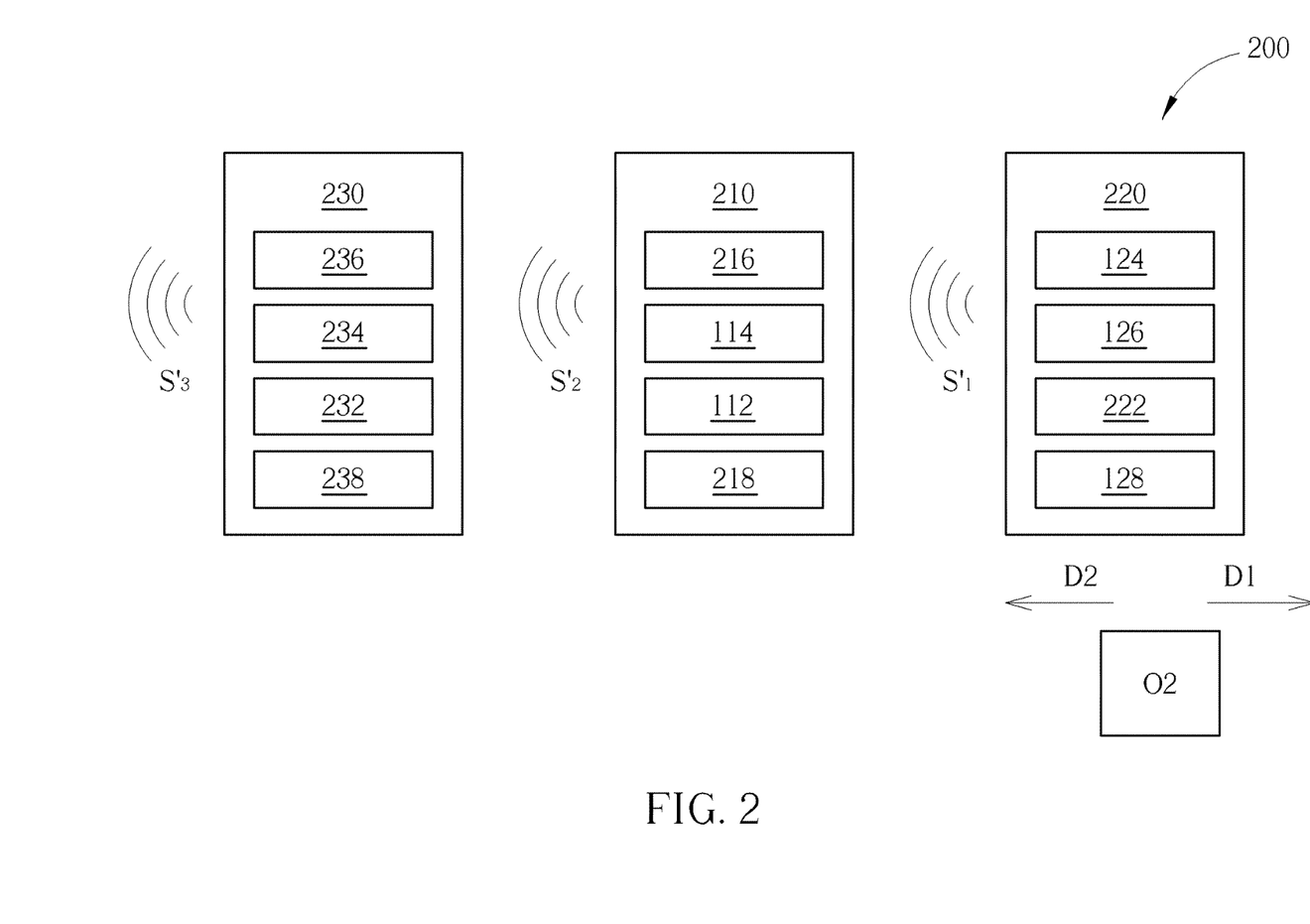
FIG. 2 shows a detection and transmission system according to another embodiment of the present invention.

FIG. 2 shows a detection and transmission system 200 according to one embodiment of the present invention. The detection and transmission system 200 includes the detection and transmission devices 210 and 220. The detection and transmission system 200 can be operated similarly to the detection and transmission system 100. The main difference between these two is in that the detection and transmission device 210 further includes a sound receiver 216 and an output device 218, and the detection and transmission device 220 further includes an object detector 222. That is, the detection and transmission devices 210 and 220 can have the same structure and the same function.

In some embodiments, when the object detector 222 detects that the moving object O2 is moving along a second direction D2, that is, the reverse direction of the first direction D1, the sound generator 124 may generate the sound signal $S'_1$ toward the second direction D2. When the sound receiver 216 receives the sound signal $S'_1$, the sound generator 114 can generate the sound signal $S'_2$ and the output device 218 can be activated, and for example, the lights can be turned on.

In some embodiments, the detection and transmission system 200 can further includes a detection and transmission device 230 disposed at a side of the detection and transmission device 210. The detection and transmission device 230 includes the object detector 232, the sound receiver 236, the sound generator 234, and the output device 238. When the sound receiver 236 receives the sound signal $S'_2$, the sound generator 234 may generate the sound signal $S'_3$, and the output device 238 can be activated. Since the detection and transmission devices 210, 220, and 230 in FIG. 2 have the same structures, the detection and transmission devices 210, 220, and 230 can generate sound signals to notify other detection and transmission devices on the path along the moving direction of the moving objects when a moving object is detected or when the sound signal generated by the other detection and transmission device is received.

In some embodiments, the output devices 218, 128, and 238 of the detection and transmission devices 210, 220, and 230 can be inactivated automatically after being activated for a predetermined time to save the power consumption.

Figure 3:
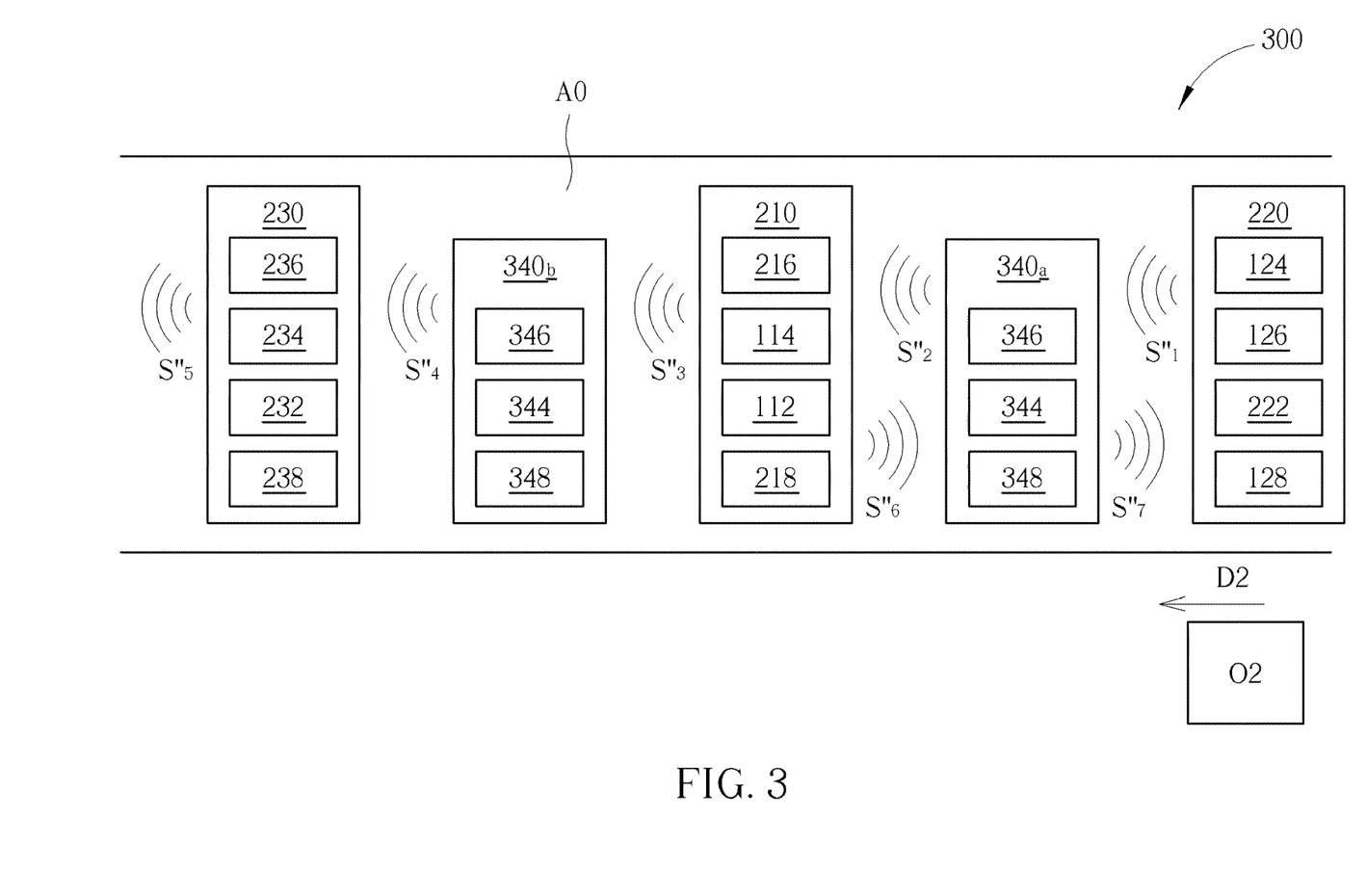
FIG. 3 shows a detection and transmission system according to another embodiment of the present invention.

FIG. 3 shows a detection and transmission system 300 according one embodiment of the present invention. The detection and transmission system 300 includes detection and transmission devices 210, 220, 230, $340_a$ and $340_b$. The main difference between the detection and transmission systems 200 and 300 is in that the detection and transmission system 300 further includes the detection and transmission devices $340_a$ and $340_b$. The detection and transmission device $340_a$ can be disposed between the detection and transmission devices 210 and 220 and the detection and transmission device $340_b$ can be disposed between the detection and transmission devices 210 and 230. The detection and transmission devices $340_a$ and $340_b$ have the same structures, and each of the detection and transmission devices $340_a$ and $340_b$ may include the sound receiver 346, the sound generator 344 and the output device 348.

In some embodiments, the detection and transmission devices 210, 220, 230, $340_a$ and $340_b$ can be disposed along the road A0. If the moving object O2 is a vehicle moving along the second direction D2, the sound generator 124 of the detection and transmission device 220 may generate the sound signal $S''_1$ toward the detection and transmission device $340_a$ when the detection and transmission device 220 detects the moving object O2. When the sound receiver 346 of the detection and transmission device $340_a$ receives the sound signal $S''_1$, the output device 348 of the detection and transmission device $340_a$ may be activated and the sound generator 344 of the detection and transmission device $340_a$ may generate the sound signal $S''_2$ toward the detection and transmission device 210. When the sound receiver 216 of the detection and transmission device 210 receives the sound signal $S''_2$, the output device 218 of the detection and transmission device 210 may be activated and the sound generator 114 of the detection and transmission device 210 may generate the sound signal $S''_3$ toward the detection and transmission device $340_b$. When the sound receiver 346 of the detection and transmission device $340_b$ receives the sound signal $S''_3$, the output device 348 of the detection and transmission device $340_b$ may be activated and the sound generator 344 of the detection and transmission device $340_b$ may generate the sound signal $S''_4$ toward the detection and transmission device 230. When the sound receiver 236 of the detection and transmission device 230 receives the sound signal $S''_4$, the output device 238 of the detection and transmission device 230 may be activated and the sound generator 234 of the detection and transmission device 230 may generate the sound signal $S''_5$.

In some embodiments, the detection and transmission devices 210, 220, 230, $340_a$ and $340_b$ can be inactivated automatically after being activated for a predetermined time. Also, the detection and transmission devices 210, 220, 230, $340_a$ and $340_b$ can set up the predetermined time according to the distances between the detection and transmission devices 210, 220, 230, $340_a$ and $340_b$ and the speed of the vehicle. For example, if the detection and transmission devices 210, 220, 230, $340_a$ and $340_b$ are disposed every 250 meters, and the speed of the moving object O2 detected by the detection and transmission device 220 is 30 km/h, then the vehicle may pass the detection and transmission device 230 in two minutes by estimation. Therefore, the output devices of the detection and transmission devices 210, 220, 230, $340_a$ and $340_b$ can be set up to be inactivated automatically after being activated for three minutes for saving the unnecessary power consumption and preserving some buffering time for the vehicle to pass.

In some embodiments, the detection and transmission system 300 can control the timing for activating the output devices of the detection and transmission devices 210, 220, 230, $340_a$ and $340_b$ according to the speed of the moving body O2. For example, if the moving object O2 moves rather fast (for example, faster than a predetermined speed such as 30 km/h), the detection and transmission devices 210, 220, 230, $340_a$ and $340_b$ may turn on the lights once receiving the corresponding sound signals $S''_1$, $S''_2$, $S''_3$, and $S''_4$, thereby providing the lights for the moving object O2 in time for the safety. However, if the moving object O2 moves rather slow (for example, slower than a predetermined speed such as 30 km/h), the detection and transmission devices 210 and $340_a$ may turn on the lights once receiving the corresponding sound signals $S''_1$ and $S''_2$ while the detection and transmission devices $340_b$ and 230 may delay a time period or wait until the detection and transmission device $340_b$ detects the moving object O2 before turning on the lights after receiving the corresponding sound signals $S''_3$ and $S''_4$.

However, the vehicle going from the detection and transmission device 220 to the detection and transmission device 210 may not further pass the detection and transmission device 230. Instead, the vehicle may pull over or even take a U-turn. Therefore, in some embodiments, when the detection and transmission device 210 receives the sound signal $S''_2$, the detection and transmission device 210 may activate the output device 218 but may not generate the sound signal $S''_3$ right away. Instead, the detection and transmission device 210 may not generate the sound signal $S''_3$ until the detection and transmission device 210 detects the moving object O2, and the detection and transmission device $340_b$ may activate the output device 348 of the detection and transmission device $340_b$ when receiving the sound signal $S''_3$. Consequently, the power consumption of the unnecessary lighting can be saved.

In addition, in some embodiments of the present invention, when the detection and transmission device 210 detects the moving object O2, the detection and transmission device 220 can generate the sound signal $S''_3$ toward the detection and transmission device $340_b$ by the sound generator 114, and the detection and transmission device 210 can activate the output device 218. Also, in this case, since the moving object O2 has already passed the detection and transmission devices 220 and $340_a$, there is no need for the detection and transmission devices 220 and $340_a$ to generate the lights. Therefore, the sound generator 114 of the detection and transmission device 210 may further generate the sound signal $S''_6$ toward the detection and transmission device $340_a$ to inactivate the output device 348 of the detection and transmission device $340_a$. When the sound receiver 346 of the detection and transmission device $340_a$ receives the sound signal $S''_6$, the output device 348 of the detection and transmission device $340_a$ will be inactivated. In addition, the detection and transmission device $340_a$ can generate the sound signal $S''_7$ toward the detection and transmission device 220 to inactivate the output device 128 of the detection and transmission device 220. Consequently, the output devices of the detection and transmission devices 210, 220, 230, $340_a$ and $340_b$ can be activated and inactivated effectively, and can save the unnecessary power consumption. In some embodiments, the sound signal $S''_6$ and the sound signal $S''_1$ may have different frequencies. Therefore, the detection and transmission device $340_a$ can identify that the sound signal is generated by the detection and transmission device 210 or the detection and transmission device 220 for activating or inactivating the output device 348 according to the frequency of the received sound signal.

In some embodiments, the detection and transmission system 300 may include more detection and transmission devices $340_a$ between the detection and transmission devices 210 and 220 or remove the detection and transmission devices $340_a$ between the detection and transmission devices 210 and 220 according to the traffic condition or the speed limit of the road A0 so that the output devices, such as the lights, on the road A0 can be controlled in an even more efficient way.

In addition, the detection and transmission devices 210, 220, 230, $340_a$ and $340_b$ can include light sensors. The light sensors can detect brightness of ambient lights, and the detection and transmission devices 210, 220, 230, $340_a$ and $340_b$ may generate lights according to the corresponding sound signals in the aforesaid process when the light sensor identifies the brightness of ambient lights being insufficient. That is, the detection and transmission devices 210, 220, 230, $340_a$ and $340_b$ may not generate lights when the ambient lights are sufficient, thereby saving the unnecessary power consumption.

Although in the detection and transmission system 300, the detection and transmission devices are disposed along single direction, in some embodiments, the detection and transmission system may be disposed along a plurality of directions according to the application and the feature of the interested route.

Figure 4:
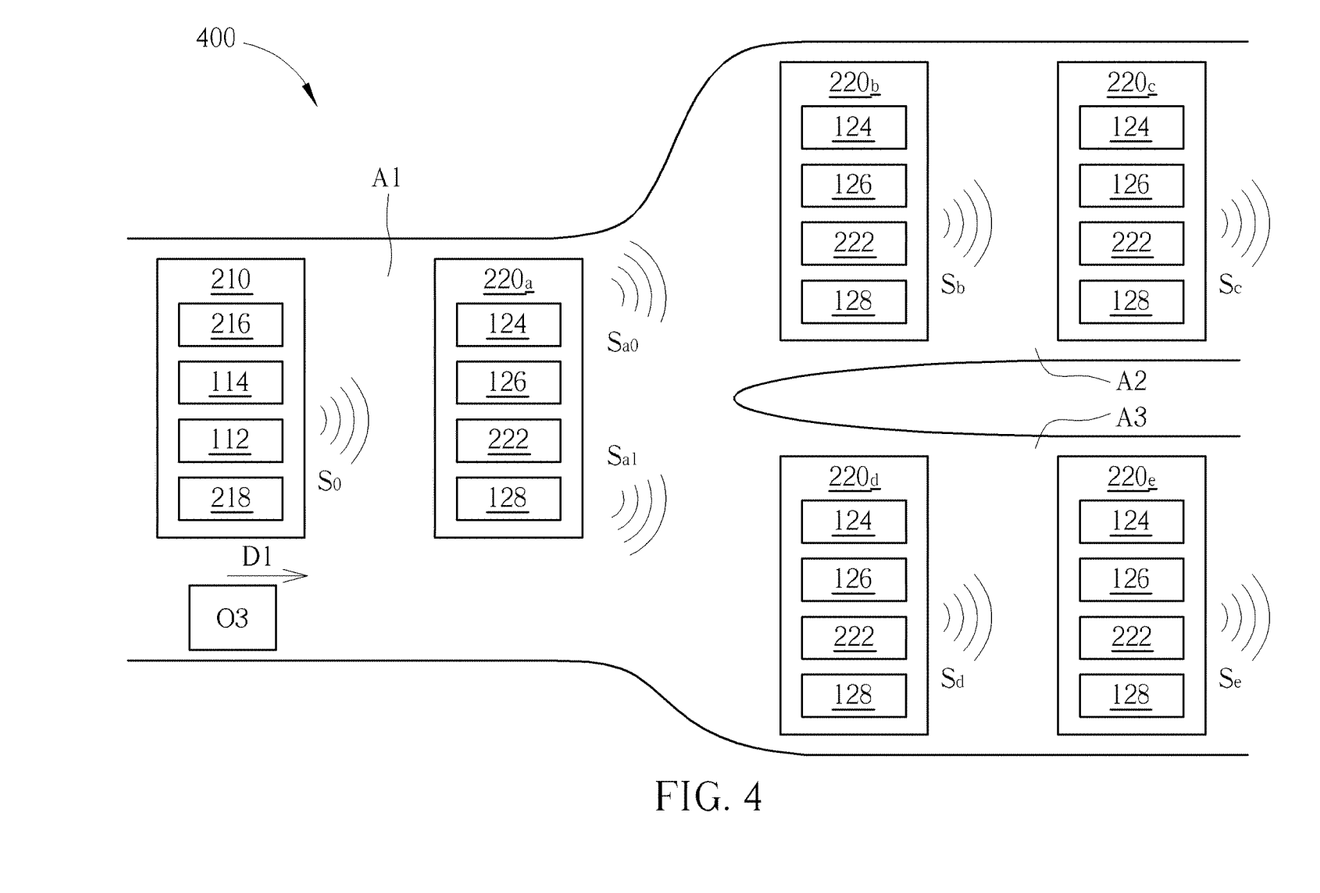
FIG. 4 shows a detection and transmission system according to another embodiment of the present invention.

FIG. 4 shows a detection and transmission system 400 according to one embodiment of the present invention. The detection and transmission system 400 includes the detection and transmission devices 210, $220_a$, $220_b$, $220_c$, $220_d$, and $220_e$. Each of the detection and transmission devices $220_a$, $220_b$, $220_c$, $220_d$, and $220_e$ has the same structure as the detection and transmission devices 220 in FIG. 2. The detection and transmission devices 210 and $220_a$ can be disposed along the road A1, the detection and transmission devices $220_b$, and 220 can be disposed along the road A2, and the detection and transmission devices $220_d$, and $220_e$ can be disposed along the road A3.

In some embodiments, when the object detector 112 detects the moving object O3 entering the road A1 along the first direction D1, the output device 218 will be activated and the sound generator 114 can generate the sound signal $S_0$ toward the detection and transmission device $220_a$. When the sound receiver 126 of the detection and transmission device $220_a$ receives the sound signal $S_0$, the output device 128 of the detection and transmission device $220_a$ will be activated and the sound generator 124 of the detection and transmission device $220_a$ can generate the sound signal $S_{a0}$ toward the detection and transmission device $220_b$ and generate the sound signal $S_{a1}$ toward the detection and transmission device $220_d$. When the sound receiver 126 of the detection and transmission device $220_b$ receives the sound signal $S_{a0}$, the output device 128 of the detection and transmission device $220_b$ will be activated and the sound generator 124 of the detection and transmission device $220_b$ can generate the sound signal $S_b$ toward the detection and transmission device 220. When the sound receiver 126 of the detection and transmission device 220$_c$ receives the sound signal S$_b$, the output device 128 of the detection and transmission device 220$_c$ will be activated and the sound generator 124 of the detection and transmission device 220$_c$ can generate the sound signal S$_c$. When the sound receiver 126 of the detection and transmission device 220$_d$ receives the sound signal S$_{a1}$, the output device 128 of the detection and transmission device 220$_d$ will be activated and the sound generator 124 of the detection and transmission device 220$_d$ can generate the sound signal S$_d$ toward the detection and transmission device 220$_e$. When the sound receiver 126 of the detection and transmission device 220$_e$ receives the sound signal S$_d$, the output device 128 of the detection and transmission device 220$_e$ will be activated and the sound generator 124 of the detection and transmission device 220$_e$ can generate the sound signal S$_e$. Consequently, each of the detection and transmission devices of the detection and transmission system 400 can be disposed according to the direction of the roads, and the output devices of the detection and transmission devices on the possible moving routes of the moving object O3 can be activated instantly once the moving object O3 is detected.

In some embodiments, when the sound receiver 126 of the detection and transmission device 220$_b$ receives the sound signal S$_{a0}$, the detection and transmission device 220$_b$ may activate the output device 128 of the detection and transmission device 220$_b$ and further confirm if the moving object O3 is detected. When the detection and transmission device 220$_b$ detects the moving object O3, the moving object O3 may very possibly enter the road A2 later. In this case, the sound generator 124 of the detection and transmission device 220$_b$ will generate the sound signal S$_b$ toward the detection and transmission device 220$_c$, and the detection and transmission device 220$_c$ will activate the output device 128 of the detection and transmission device 220$_c$ when receiving the sound signal S$_b$. Consequently, if the moving object O3 enters the road A3, instead of road A2, the output device of the detection and transmission device 220$_c$ and the output devices of other detection and transmission devices on the road A2, if any, will not be activated so that the unnecessary power consumption can be saved. However, in some embodiments, the timings for the detection and transmission devices to transmit the sound signals and activate the output devices may also be adjusted according to the system requirement.

The detection and transmission systems 100, 200, 300 and 400 can activate the output devices, such as turn on the lights, according to the moving route of the moving objects. Therefore, the case that the output devices cannot be activated for the user in time due to the inefficient triggering condition of detecting the presence of the object as mentioned in the prior art can be avoided.

Figure 5:
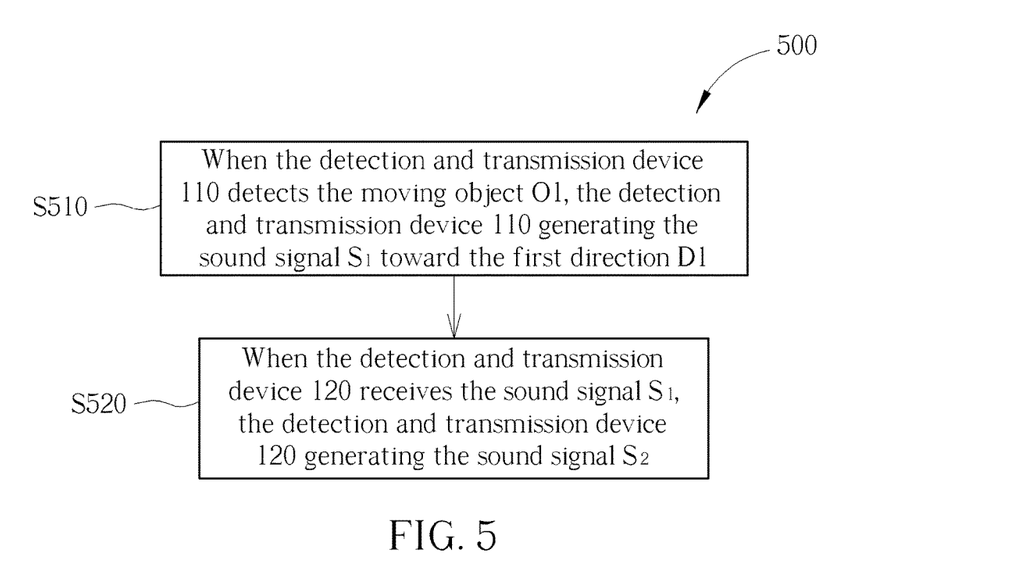
FIG. 5 shows a method for operating the detection and transmission system of FIG. 1.

FIG. 5 shows a method 500 for operating the detection and transmission system 100. The method 500 includes steps S510 and S520.

S510: when the detection and transmission device 110 detects the moving object O1, the detection and transmission device 110 generating the sound signal S$_1$ toward the first direction D1;

S520: when the detection and transmission device 120 receives the sound signal S$_1$, the detection and transmission device 120 generating the sound signal S$_2$.

Figure 6:
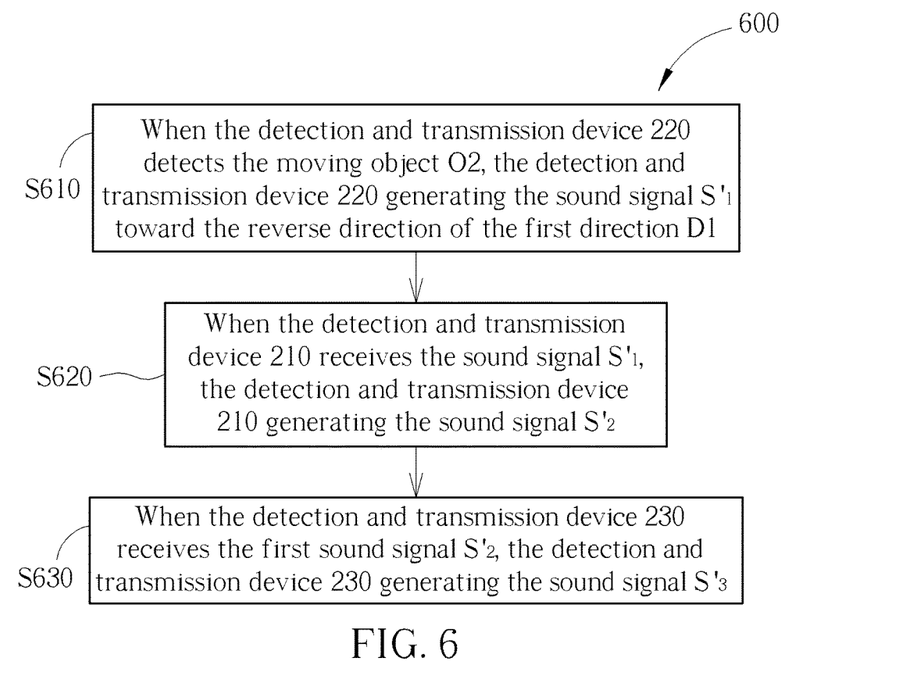
FIG. 6 shows a method for operating the detection and transmission system of FIG. 2.

FIG. 6 shows a method 600 for operating the detection and transmission system 200. The method 600 includes steps S610 to S630.

S610: when the detection and transmission device 220 detects the moving object O2, the detection and transmission device 220 generating the sound signal S'$_1$ toward the reverse direction of the first direction D1;

S620: when the detection and transmission device 210 receives the sound signal S'$_1$, the detection and transmission device 210 generating the sound signal S'$_2$; and S630: when the detection and transmission device 230 receives the first sound signal S'$_2$, the detection and transmission device 230 generating the sound signal S'$_3$.

In some embodiments, the method 500 may also be applied to the detection and transmission system 200. That is, when the detection and transmission device 210 detects a moving object, the detection and transmission device 210 can generate a sound signal toward the first direction D1. Also, when the detection and transmission device 220 receives the sound signal generated by the detection and transmission device 210, the detection and transmission device 220 can generate a sound signal.

The methods 500 and 600 for operating the detection and transmission system 200 can activate the output devices, such as turn on the lights, according to the moving route of the moving objects. Therefore, the case that the output devices cannot be activated for the user in time due to the inefficient triggering condition of detecting the presence of the object as mentioned in the prior art can be avoided.

In summary, according to the detection and transmission systems and the methods for operating the detection and transmission systems provided by the embodiments of the present invention, the output devices on the moving route of the moving objects can be activated according to the movement of the object. Therefore, the case that the output devices cannot be activated for the user in time due to the inefficient triggering condition of detecting the presence of the object as mentioned in the prior art can be avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A detection and transmission system comprising:
   a first detection and transmission device comprising:
      a first object detector configured to detect object motion; and
      a first sound generator configured to generate sound signals; and
   a second detection and transmission device disposed along a first direction of the first detection and transmission device comprising:
      a second sound receiver configured to receive sound signals; and
      a second sound generator configured to generate sound signals;
   wherein:
      when the first object detector detects a first moving object, the first sound generator generates a first sound signal toward the first direction; and
      when the second sound receiver receives the first sound signal, the second sound generator generates a second sound signal.

2. The detection and transmission system of claim 1, wherein when the first object detector detects the first moving object, the first sound generator generates the first sound signal toward the first direction is:

when the first object detector detects the first moving object moving along the first direction, the first sound generator generates the first sound signal toward the first direction.

3. The detection and transmission system of claim 1, wherein the sound signals generated by the first sound generator and the second sound generator are ultrasound signals.

4. The detection and transmission system of claim 1, wherein the second detection and transmission device further comprises:
a second object detector configured to detect object motion.

5. The detection and transmission system of claim 4, wherein:
the first detection and transmission device further comprises a first sound receiver;
when the second object detector detects a second moving object, the second sound generator generates a third sound signal toward the first detection and transmission device; and
when the first sound receiver receives the third sound signal, the first sound generator generates a fourth sound signal.

6. The detection and transmission system of claim 5, wherein the first detection and transmission device further comprises a first output device configured to activate a first function to generate lights, audio signals, video signals, audio and video signals, or network signals when the first sound receiver receives the third sound signal.

7. The detection and transmission system of claim 5, wherein when the first sound receiver receives the third sound signal, the first sound generator generates the fourth sound signal is:
when the first sound receiver receives the third sound signal and the first object detector detects the second moving object, the first sound generator generates the fourth sound signal along the first direction.

8. The detection and transmission system of claim 7, wherein the second detection and transmission device further comprises a second output device configured to activate the first function when the second object detector detects the second moving object, and inactivate the first function when the second sound receiver receives the fourth sound signal.

9. The detection and transmission system of claim 5, wherein when the first sound receiver receives the third sound signal, the first sound generator further generates a fifth sound signal, and the detection and transmission system further comprises:
a third detection and transmission device disposed at a side of the first detection and transmission device, the third detection and transmission device comprising:
a third object detector configured to detect object motion;
a third sound receiver configured to receive sound signals; and
a third sound generator configured to generate sound signals;
wherein when the third sound receiver receives the fifth sound signal, the third sound generator generates a sixth sound signal.

10. The detection and transmission system of claim 5, wherein the first detection and transmission device further comprises:
a light sensor configured to detect brightness of ambient lights; and an output device configured to generate lights when the first sound receiver receives the third sound signal and the light sensor identifies the brightness of ambient lights being insufficient.

11. A method for operating a detection and transmission system, the detection and transmission system comprising a first detection and transmission device and a second detection and transmission device, the second transmission device disposed along a first direction of the first detection and transmission device, the method comprising:
when the first detection and transmission device detects a first moving object, the first detection and transmission device generating a first sound signal toward the first direction; and
when the second detection and transmission device receives the first sound signal, the second detection and transmission device generating a second sound signal.

12. The method of claim 11, further comprising:
the first detection and transmission device detecting a moving direction of the first moving object;
wherein, the moving direction is same as the first direction.

13. The method of claim 11, wherein the first sound signal and the second sound signal are ultrasound signals.

14. The method of claim 11, further comprising:
when the second detection and transmission device detects a second moving object, the second detection and transmission device generating a third sound signal toward a reverse direction of the first direction; and
when the first detection and transmission device receives the third sound signal, the first detection and transmission device generating a fourth sound signal.

15. The method of claim 14, further comprising:
when the first sound receiver receives the third sound signal, the first detection and transmission device activating a first function to generate lights, audio signals, video signals, audio and video signals, or network signals.

16. The method of claim 14, wherein when the first detection and transmission device receives the third sound signal, the first detection and transmission device generates the fourth sound signal is:
when the first detection and transmission device receives the third sound signal and detects the second moving object, the first detection and transmission device generates the fourth sound signal along the first direction.

17. The method of claim 16, further comprising:
when the second detection and transmission device detects the second moving object, the second detection and transmission device activating a second output device; and
when the second detection and transmission device receives the fourth sound signal, the second detection and transmission device inactivating the second output device.

18. The method of claim 14, further comprising:
when the first detection and transmission device receives the third sound signal and detects the second moving object, the first detection and transmission device generating a fifth sound signal toward a third detection and transmission device; and
when the third detection and transmission device receives the fifth sound signal, the third detection and transmission device generating a sixth sound signal.

19. The method of claim 14, further comprising:
when the first detection and transmission device receives the third sound signal and a light sensor of the first detection and transmission device identifies the brightness of ambient lights being insufficient, the first detection and transmission device generating lights.

* * * * *